June 15, 1937. W. C. HEDGCOCK 2,083,910
UNIT CYLINDER DRUM BRAKE
Filed Sept. 8, 1936 2 Sheets-Sheet 1
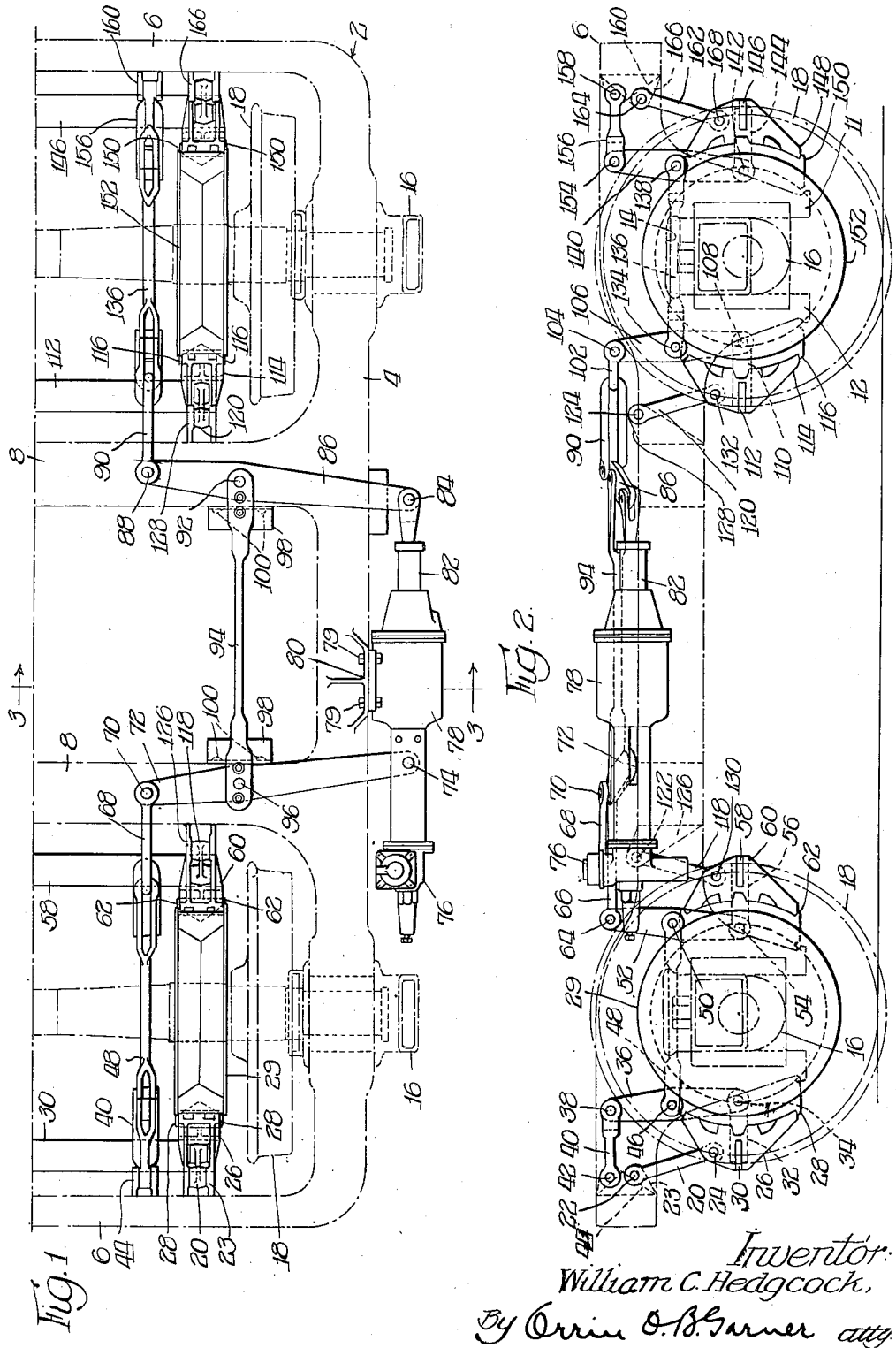
Inventor:
William C. Hedgcock,
By Orrin O. B. Garner atty June 15, 1937. W. C. HEDGCOCK 2,083,910
UNIT CYLINDER DRUM BRAKE
Filed Sept. 8, 1936 2 Sheets-Sheet 2
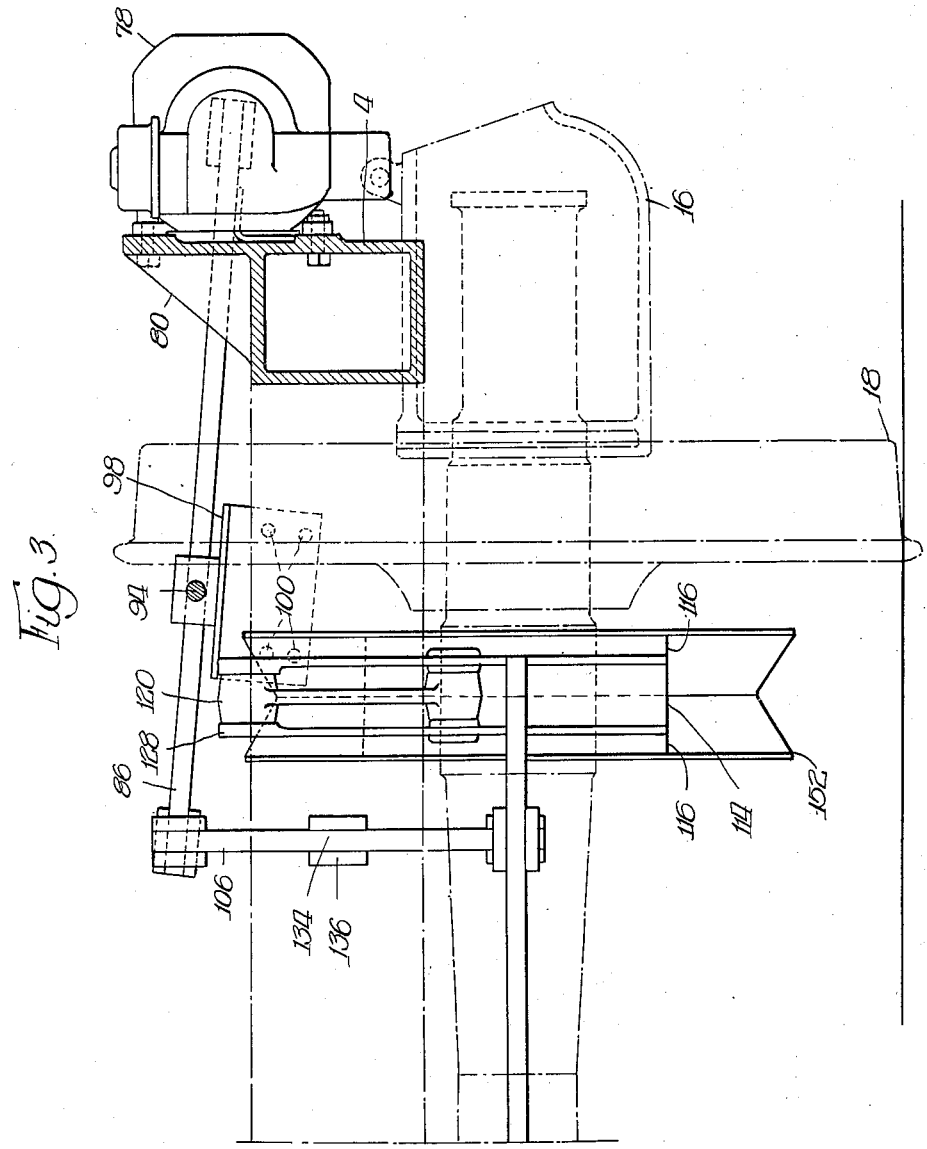
Inventor:
William C. Hedgcock,
By Orrin O. B. Garner atty.

Patented June 15, 1937

2,083,910

UNITED STATES PATENT OFFICE 2,083,910

UNIT CYLINDER DRUM BRAKE

William C. Hedgcock, Chicago, Ill., assignor to American Steel Foundries, Chicago, Ill., a corporation of New Jersey Application September 8, 1936, Serial No. 99,772

20 Claims. (Cl. 188—58)

This invention pertains to brakes and more particularly to brakes of the drum type wherein brake shoes are applied to opposite sides of each drum. In the construction contemplated a drum is associated with each car wheel and mounted adjacent thereto on the same axle.

An object of this invention is to provide a clasp brake arrangement for drum brakes which will be adaptable to more recent designs of railway truck equipment.

A further object of my invention is to provide a clasp brake arrangement for drum brakes wherein the power means is mounted on the truck instead of upon the car body.

A yet further object of my invention is the provision of a form of drum brake equipment which will be economical of space and relatively simple in form, thereby facilitating its use on modern high-speed trains.

With these and various other objects in view my invention may consist of certain novel features of construction and operation as will be more fully described and particularly pointed out in the specification, drawings, and claims appended hereto.

In the drawings which illustrate embodiments of my invention and wherein like reference characters are used to designate like parts—

Figure 1 is a top plan view of a railway car truck embodying my invention, only one-half of the truck structure being shown inasmuch as the arrangement on the opposite sides of the truck is the same and such a showing, it is believed, is simpler and will facilitate understanding of the invention;

Figure 2 is a side elevation of the truck structure shown in Figure 1; and

Figure 3 is a vertical sectional view taken adjacent the transverse center line of the truck, substantially in the plane indicated by the line 3—3 of Figure 1.

Referring to the drawings in more detail, the truck 2 is of a well known form, having the side frames 4 integrally joined at their ends by the end rails 6—6 and at points adjacent the transverse center line by parallel transoms 8—8 defining the opening for the bolster (not shown) upon which the car body rests. Adjacent the ends of each side frame 4 are the integrally formed columns 11 and 12 defining the window opening 14 for the reception of journal boxes 16 for connection to the journal portion of the associated wheel and axle assembly 18. The equalizing arrangement and the method of resiliently supporting the truck frame being no part of this invention and being well known in the art, are omitted from the drawings for the sake of simplicity.

The brake rigging comprises the hanger 20 (Figure 2, left) pivotally supported at its upper end as at 22 from the bracket 23 integrally formed on the truck frame, the lower end of the hanger being pivotally connected as at 24 to the brake head 26 with its associated pair of brake shoes 28—28. The brake shoes 28—28 have engagement with the V-shaped periphery of the drum 29, the structure of said brake heads 26, brake shoes 28, and drums 29 conforming to the design shown in my co-pending application identified by Serial No. 52,454, filed in the United States Patent Office on December 2, 1935. The brake head 26 is mounted upon the end of the beam 30 and adjacent thereto the fulcrum 32 is secured to the beam, the projecting end of the fulcrum having a pivotal connection as at 34 to the lower end of the dead truck lever 36, the upper end of said dead truck lever being pivotally connected as at 38 to the link 40 which is pivotally secured at its opposite end as at 42 to the bracket 44 integrally formed on the end rail of the truck frame. At a point intermediate its ends the dead truck lever 36 is pivotally connected as at 46 to the pull rod 48, the opposite end of said pull rod being pivotally connected as at 50 to the live truck lever 52, said live truck lever being pivotally secured at its lower end as at 54 to the fulcrum 56 secured on the brake beam 58 adjacent the end thereof. The brake head 60 is mounted on the end of the brake beam 58 and carries the paired brake shoes 62—62 which have engagement with the opposite periphery of the drum 29. The upper end of the live truck lever 52 has a pivotal connection as at 64 to the clevis 66 which in turn is connected to the closed end of the link 68, the open or jaw end thereof being pivotally connected as at 70 to the dead cylinder lever 72, the opposite end of the dead cylinder lever being pivotally and adjustably connected as at 74 to the automatic slack adjuster 76. The slack adjuster 76 is mounted on one end of the cylinder 78, said cylinder being secured as by means of the bolt and nut assemblies 79—79 to the bracket 80 integrally formed on the side frame 4. The cylinder piston 82 is pivotally connected as at 84 to the live cylinder lever 86 and the opposite end of the live cylinder lever is pivotally connected as at 88 to the open end of the link 90. The live cylinder lever has a pivotal and adjustable connection at a point intermediate its ends as at 92 to the pull rod 94, and the opposite end of said pull rod is pivotally and adjustably connected as at 96 to a point intermediate the ends of the dead cylinder lever 72. Brackets 98—98 are secured to the transoms 8—8 as by means of the rivets 100—100, said brackets providing support means upon which the pull rod 94 may have sliding engagement adjacent each end thereof. The closed end of the link 90 is connected to the clevis 102 and the open end of said clevis has a pivotal connection as at 104 to the upper end of the live truck lever 106, the lower end of said live truck lever having a pivotal connection as at 108 to the fulcrum 110 mounted on the brake beam 112 adjacent the end thereof. The brake head 114 is mounted upon the end of the brake beam 112 and carries the paired brake shoes 116—116.

Support means for the rigging intermediate the wheels is provided by means of the hangers 118 and 120 which are pivotally secured at their upper ends as at 122 and 124, respectively, to the brackets 126 and 128 integrally formed on the transoms 8—8. The lower ends of the hangers 118 and 120 provide support for the beams 58 and 112, respectively, by pivotal connections as at 130 and 132 to the respective brake heads 60 and 114.

The live truck lever 106 has a pivotal connection intermediate its ends as at 134 with the pull rod 136, the opposite end of said pull rod having a pivotal connection as at 138 to the dead truck lever 140 at a point intermediate its ends. The lower end of the dead truck lever 140 has a pivotal connection as at 142 to the fulcrum 144 which is mounted on the beam 146 adjacent the end thereof. The brake head 148 is mounted on the end of the beam 146 and carries the paired brake shoes 150—150, said shoes having engagement with the periphery of the drum 152 at one side thereof, the opposite side being engaged by the brake shoes 116—116 previously mentioned. The upper end of the dead truck lever 140 has a pivotal connection as at 154 to the link 156, the opposite end of the link 156 having a pivotal connection as at 158 to the bracket 160 integrally formed on the end rail 6.

Support means for the rigging at this end of the truck is provided by the hanger 162, having a pivotal connection at its upper end as at 164 to the bracket 166 integrally formed on the end rail 6, the lower end of said hanger having a pivotal connection as at 168 to the brake head 148.

In operation, actuation of the power means or cylinder 78 causes the piston 82 to move to the right as viewed in Figures 1 and 2, thus rotating the live cylinder lever 86 in a counter-clockwise direction about the pivot 92 and causing the live truck lever 106 to rotate in a counter-clockwise direction about the pivot 134 until the brake shoes 116 are brought into engagement with the adjacent V-shaped periphery of the drum 152. Further movement causes the live truck lever 106 to turn in a counter-clockwise direction about the pivot 108 at its lower end, moving the pull rod 136 to the left and causing rotation of the dead truck lever 140 in a clockwise direction about the pivot 154 at its upper end until the brake shoes 150 are brought into engagement against the opposite periphery of the drum 152.

As movement of the piston continues, the live cylinder lever 86 moves in a counter-clockwise direction about the pivot 88 at its inner end, causing the pull rod 94 to move to the right. This movement of the pull rod 94 rotates the dead cylinder lever 72 in a clockwise direction about the pivot 74 at its outer end, thus causing clockwise rotation of the live truck lever 52 about the pivot point 50 intermediate its ends until the brake shoes 62 are brought into engagement with the adjacent V-shaped periphery of the drum 29. Further movement causes the live truck lever 52 to rotate in a clockwise direction about the pivot 54 at its lower end, thus moving the pull rod 48 to the right and causing counter-clockwise rotation of the dead truck lever 36 about the pivot 38 at its upper end until the brake shoes 28 are brought into engagement with the opposite periphery of the drum 29. Release of the power means causes the parts to move in the reverse of that described, thus releasing the shoes from engagement with the brake drums.

Although I have described the operation of this rigging step by step, it will be understood that the various parts act substantially simultaneously so that all the brake shoes are brought into engagement with the peripheries of the adjacent drums approximately at the same moment. The sequence in which the operation is described is a matter of convenience to facilitate its understanding.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a brake rigging for a railway car truck the combination of a truck frame, power means mounted thereon, wheel and axle assemblies associated therewith, brake drums mounted on said axles adjacent each of said wheels, hangers hung from said frame and supporting brake beams outwardly of said wheels, other brake beams supported intermediate said wheels, brake shoes carried by said beams and having braking engagement at opposite sides of each of said drums, dead truck levers supported at their lower ends on said beams outwardly of said wheels and fulcrumed at their upper ends from said frame, live truck levers supported at their lower ends from said beams intermediate said wheels, pull rods connecting said live and dead truck levers for each wheel, and live and dead cylinder levers having their outer ends connected respectively to the opposite ends of said power means and their inner ends connected respectively to said live truck levers.

2. In a railway car truck the combination of a truck frame, wheel and axle assemblies associated therewith, power means mounted thereon and carrying a slack adjuster, and brake rigging comprising brake drums mounted on said axles adjacent each of said wheels, brake beams supported outwardly of said wheels, hangers supporting brake beams intermediate said wheels, brake shoes carried by said beams and having braking engagement at opposite sides of each of said drums, dead truck levers pivotally supported at their lower ends from the beams outwardly of said wheels and fulcrumed from said frame at their upper ends, live truck levers pivotally supported at their lower ends from the beams intermediate said wheels, pull rods connecting said live and dead truck levers for each wheel, and live and dead cylinder levers having their inner ends connected respectively to said live truck levers and their outer ends connected respectively to said power means and to said slack adjuster.

3. In a brake rigging for a railway car truck the combination of a truck frame, wheel and axle assemblies associated therewith, power means mounted thereon and carrying a slack adjuster, brake drums mounted on said axles adjacent each of said wheels, brake beams supported on opposite sides of each wheel and axle assembly, dead truck levers supported at their lower ends from said beams outwardly of said wheels and fulcrumed at their upper ends from said frame, live truck levers pivotally supported at their lower ends from said beams intermediate the wheels, pull rods connecting said live and dead truck levers for each wheel, live and dead cylinder levers having their inner ends connected respectively to said live truck levers and their outer ends connected respectively to said power means and to said slack adjuster, a pull rod adjustably connecting said live and dead cylinder levers at points intermediate their ends, and brackets secured to said frame and supporting said last-mentioned pull rod adjacent its opposite ends.

4. In a brake rigging for a railway car truck the combination of a truck frame, wheel and axle assemblies associated therewith, power means mounted thereon, said power means carrying a slack adjuster, brake drums mounted on said axles adjacent each of said wheels, brake beams supported on opposite sides of each of said wheel and axle assemblies, dead truck levers pivotally supported at their lower ends from the beams outwardly of said wheels, live truck levers pivotally supported at their lower ends from the beams intermediate said wheels, pull rods connecting the live and dead truck levers for each wheel, live and dead cylinder levers having their inner ends connected respectively to said live truck levers and their outer ends connected respectively to said power means and to said slack adjuster, a pull rod adjustably connecting said live and dead cylinder levers at points intermediate their ends, and brackets carried by said frame and supporting said pull rod at points adjacent its ends.

5. In a brake rigging for a railway car truck the combination of a truck frame, wheel and axle assemblies associated therewith, power means mounted thereon, said power means carrying a slack adjuster, brake drums mounted on said axles adjacent each of said wheels, brake beams supported on opposite sides of each of said wheel and axle assemblies, dead truck levers pivotally supported at their lower ends from said beams outwardly of said wheels and fulcrumed at their upper ends from said frame, live truck levers pivotally supported at their lower ends from said beams intermediate the wheels, pull rods connecting said live and dead truck levers for each wheel, live and dead cylinder levers having their inner ends connected respectively to said live truck levers and their outer ends connected respectively to said power means and to said slack adjuster, a pull rod adjustably connecting said live and dead cylinder levers at points intermediate their ends, and brackets secured on said frame and supporting said last mentioned pull rod at points adjacent its ends.

6. In a railway truck the combination of a truck frame, wheel and axle assemblies, brake rigging comprising power means mounted on said truck frame and carrying a slack adjuster, brake drums mounted on said axles adjacent each wheel, hangers supporting brake beams from said frame on opposite sides of each wheel and axle assembly, dead truck levers having their lower ends pivoted on the beams outwardly of said wheels and their upper ends fulcrumed from said frame, live truck levers having their lower ends pivoted on the beams intermediate said wheels and their upper ends connected respectively to corresponding ends of live and dead cylinder levers, pull rods connecting said live and dead truck levers, and a pull rod connecting said live and dead cylinder levers, the opposite ends of said live and dead cylinder levers being connected respectively to said power means and to said slack adjuster.

7. In a car truck the combination of a truck frame, wheel and axle assemblies, brake rigging comprising power means mounted on said frame, brake drums mounted on said axles adjacent each wheel, hangers supporting brake beams outwardly of said wheels, other brake beams supported intermediate said wheels, brake shoes carried by said beams and having engagement at opposite sides of each of said drums, dead truck levers pivotally supported at their lower ends on said beams outwardly of said wheels, live truck levers pivotally supported from their lower ends on said beams intermediate said wheels, pull rods connecting said live and dead truck levers for each wheel, and live and dead cylinder levers adjustably connected at points intermediate their ends by a pull rod and having their corresponding ends connected respectively to said live truck levers and to the opposite ends of said power means.

8. In a car truck the combination of a truck frame, wheel and axle assemblies, brake rigging comprising power means mounted on said frame, brake drums mounted on said axles adjacent each wheel, brake beams supported outwardly of said wheels, hangers supporting other brake beams intermediate said wheels, brake shoes carried by said beams and having engagement at opposite sides of each of said drums, dead truck levers pivotally supported at their lower ends on said beams outwardly of said wheels, live truck levers pivotally supported from their lower ends on said beams intermediate said wheels, pull rods connecting said live and dead truck levers for each wheel, and live and dead cylinder levers adjustably connected at points intermediate their ends by a pull rod and having their corresponding ends connected respectively to said live truck levers and to the opposite ends of said power means.

9. In a car truck the combination of a truck frame, wheels and axles, brake rigging comprising power means mounted on said frame, brake drums mounted on said axles adjacent each wheel, hangers supporting brake beams from said frame on opposite sides of each wheel and axle, brake shoes carried by said beams and having engagement at opposite sides of each of said drums, dead truck levers pivotally supported at their lower ends on said beams outwardly of said wheels, live truck levers pivotally supported from their lower ends on said beams intermediate said wheels, pull rods connecting said live and dead truck levers for each wheel, and live and dead cylinder levers adjustably connected at points intermediate their ends by a pull rod and having their corresponding ends connected respectively to said live truck levers and to the opposite ends of said power means.

10. In a railway truck the combination of a truck frame, power means mounted thereon, wheel and axle assemblies, brake rigging comprising drums mounted on said axles adjacent each of said wheels, brake beams supported on opposite sides of each wheel and axle assembly, brake shoes carried by said beams and having braking engagement at opposite sides of each of said drums, dead truck levers pivotally supported from their lower ends on the beams outwardly of said wheels and fulcrumed from said frame at their upper ends, live truck levers pivotally supported from their lower ends on the beams intermediate said wheels, pull rods connecting said live and dead truck levers, and live and dead cylinder levers having their inner ends connected respectively to said live truck levers and their outer ends connected to the opposite ends of said power means.

11. In a brake rigging for a railway truck, the combination of a truck frame, power means mounted thereon and carrying a slack adjuster, wheel and axle assemblies associated therewith, brake drums mounted on said axles adjacent each of said wheels, hangers hung from said frame for supporting brake beams on opposite sides of each wheel and axle assembly, dead truck levers pivotally supported at their lower ends from said beams outwardly of said wheels, live truck levers supported from their lower ends on the brake beams intermediate said wheels, pull rods connecting said live and dead truck levers for each wheel, and live and dead cylinder levers having their inner ends connected respectively to said live truck levers and their outer ends connected respectively to said cylinder and to said slack adjuster.

12. In a railway brake rigging the combination of a truck frame, wheel and axle assemblies, power means mounted on said frame, brake drums mounted on said axles adjacent each of said wheels, hangers supporting brake beams from said frame at opposite sides of each wheel and axle assembly, dead truck levers pivotally supported from their lower ends on the beams outwardly of said wheels, live truck levers pivotally supported from their lower ends on the beams intermediate said wheels, pull rods connecting said live and dead truck levers for each wheel, and live and dead cylinder levers having corresponding ends connected respectively to said live truck levers and to opposite ends of said power means.

13. In a railway brake rigging the combination of a truck frame including wheel and axle assemblies, power means mounted on said frame, brake drums mounted on said axles adjacent each of said wheels, hangers supporting brake beams from said frame at opposite sides of each wheel and axle assembly, dead truck levers pivotally supported from their lower ends on the beams outwardly of said wheels and fulcrumed from said frame at their upper ends, live truck levers pivotally supported from their lower ends on the beams intermediate said wheels, pull rods connecting said live and dead truck levers for each wheel, and live and dead cylinder levers having corresponding ends connected respectively to said live truck levers and to opposite ends of said power means.

14. In a railway car truck the combination of a truck frame, power means and an associated slack adjuster mounted on said frame, wheel and axle assemblies and brake rigging comprising brake drums mounted on said axles adjacent each of said wheels, hangers hung from said frame and supporting brake beams outwardly of said wheels, other brake beams supported intermediate said wheels, dead truck levers pivotally supported at their lower ends from the beams outwardly of said wheels and having their upper ends fulcrumed from said frame, live truck levers pivotally supported at their lower ends from the beams intermediate said wheels, pull rods connecting said live and dead truck levers for each wheel, live and dead cylinder levers having their inner ends connected respectively to said live truck levers and their outer ends connected respectively to said power means and to said slack adjuster, a pull rod pivotally connecting said live and dead cylinder levers at points intermediate their ends, and brackets mounted on said frame and supporting said last-mentioned pull rod at points adjacent its ends.

15. In a railway car truck the combination of a truck frame, power means mounted on said frame, wheel and axle assemblies and brake rigging comprising brake drums mounted on said axles adjacent each of said wheels, hangers hung from said frame and supporting brake beams outwardly of said wheels, other brake beams supported intermediate said wheels, dead truck levers pivotally supported at their lower ends from the beams outwardly of said wheels and having their upper ends fulcrumed from said frame, live truck levers pivotally supported at their lower ends from the beams intermediate said wheels, pull rods connecting said live and dead truck levers for each wheel, live and dead cylinder levers having their inner ends connected respectively to said live truck levers and their outer ends connected respectively to opposite ends of said power means, a pull rod pivotally connecting said live and dead cylinder levers at points intermediate their ends, and brackets mounted on said frame and supporting said last-mentioned pull rod at points adjacent its ends.

16. In a brake rigging for a railway car truck the combination of a truck frame, wheel and axle assemblies associated therewith, power means mounted thereon and carrying a slack adjuster, brake beams supported outwardly of said wheels, hangers hung from said frame and supporting other brake beams intermediate said wheels, dead truck levers pivotally connected to the beams outwardly of said wheels and having their upper ends fulcrumed from said frame, live truck levers pivotally connected at their lower ends to said beams intermediate the wheels, pull rods connecting said live and dead truck levers for each wheel, and live and dead cylinder levers having their inner ends connected respectively to said live truck levers and their outer ends connected respectively to said power means and to said slack adjuster.

17. In a brake rigging for a railway car truck the combination of a truck frame, power means mounted thereon, wheel and axle assemblies, brake drums mounted on said axles adjacent each of said wheels, brake beams supported at opposite sides of each of said assemblies, dead truck levers connected to the beams outwardly of said wheels, live truck levers connected to the beams intermediate said wheels, pull rods connecting the live and dead truck levers for each wheel, and live and dead cylinder levers having their inner ends connected respectively to said live truck levers and their outer ends connected to opposite ends of said power means.

18. In a brake rigging for a railway car truck the combination of a truck frame, power means mounted thereon, wheels and axles, brake drums, brake beams having brake shoes for engagement at opposite sides of said drums, live and dead truck levers connected to the beams on opposite sides of each axle and connected to each other, and live and dead cylinder levers having corresponding ends connected to said power means and their opposite ends connected respectively to said live truck levers.

19. In a railway car truck the combination of a truck frame, power means mounted thereon, wheel and axle assemblies, brake drums, brake beams supported at opposite sides of each of said assemblies and carrying brake shoes having engagement at opposite sides of each of said drums, live and dead truck levers connected to the beams at opposite sides of each of said assemblies and connected to each other, and operative connections between said power means and said live truck levers.

20. In a brake rigging for a railway car truck the combination of a truck frame, power means mounted thereon, wheels and axles, brake drums, brake beams having brake shoes for engagement at opposite sides of said drums, live and dead truck levers connected to the beams on opposite sides of each axle and connected to each other, and operative connections between said power means and said live truck levers.

WILLIAM C. HEDGCOCK.